N. H. PURCELL.
Grain Drill.
No. 50,954.  Patented Nov. 14, 1865.
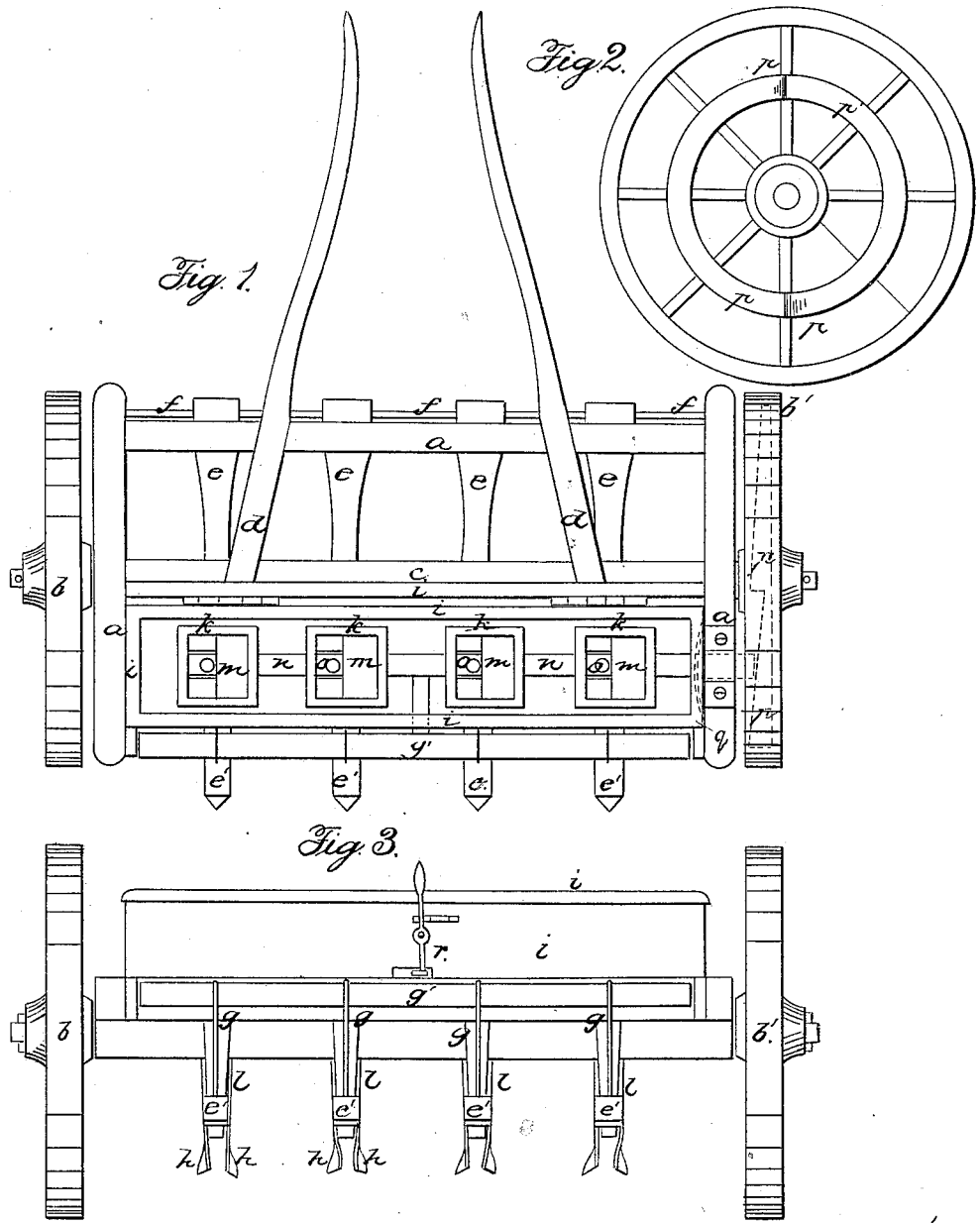

UNITED STATES PATENT OFFICE.

NEAL H. PURCELL, OF AVON, NEW YORK.

IMPROVEMENT IN GRAIN-PLANTERS.

Specification forming part of Letters Patent No. 50,954, dated November 14, 1865.

*To all whom it may concern:*

Be it known that I, NEAL H. PURCELL, of the town of Avon, in the county of Livingston, in the State of New York, have invented certain new and useful Improvements in Grain-Planters; and I do hereby declare that the following is a full, clear, and exact description of the construction and mode of operation of the same, reference being had to the annexed drawings, making a part of this specification, in which—

Figure I is a vertical view of the entire machine. Fig. II is an end view. Fig. III is a view of one of the wheels to which the cams (hereinafter described) are attached.

In all these figures the same letters refer to the same part.

The nature of my invention is such that it can be made to distribute the grain, whatever kind it may be, automatically in any required quantity and regularly at any required distances apart.

In the machine, as represented on the drawings, $a$ is the frame; $b$ and $b'$, the wheels; $c$, the axle, and $d$ the shafts. $e\ e\ e\ e$ are beams, curved downward, extending entirely under the frame, their posterior ends being marked with the letters $e'\ e'$, &c. The anterior ends of these beams are suspended upon a rod, $f$, which is secured in place near the anterior ends of the side pieces of the frame or in a cleat attached thereto. The posterior end of these beams $e'\ e'\ e'\ e'$ hang free, but are suspended by cords or chains $g\ g\ g\ g$, which are attached above to the roller $g'$. This roller may be made to revolve by any of the well-known devices used for such purposes, and doing so it raises or lowers the free end and body of the beams, giving them a radial motion, the center of which is where the rod $f$ passes through their anterior ends. To each one of the beams there is fastened a drilling-share (not shown in the drawings) for making a drill for the reception of the grain, and behind it two shares, $h\ h$, flaring from within outward, to throw the earth back again upon the seed after it has been deposited in the drill. Between the drill-share and the two flanged shares there is a hole or orifice, through which passes loosely a tube connected with the seed-box for dropping the seed or grain in the drill.

In the drawings hereto attached I have shown four beams, $e\ e\ e\ e$; but as each grain or seed box, hereinafter described, requires one, and one only, of these beams and their attachments, the number of beams will be governed by the number of these boxes.

In Fig. III, $i$ represents the case for the seed or grain boxes, as seen from behind, closed up by the lid $i'$. In Fig. I, the same letters $i\ i\ i\ i$ show the case open, with the lid $i'$ standing vertically. In the inside of this case are the grain-boxes $k\ k\ k\ k$, four in number, corresponding with the four beams $e\ e\ e\ e$. These boxes are, therefore, the receptacles for the grain or seed to be planted. Through the bottom of each there is an opening, (not shown in the drawings,) through which the grain passes into the tube $l$, from which it drops into the drill. This hole or orifice is covered by a diaphragm covering about one-half of the bottom of each box, and just near enough thereto to allow the slide $n\ n$ to play freely between the two.

The seed-boxes are not fixed or permanently attached to one position in the chest or case $i$, but may be brought nearer together or may be removed farther from each other, to suit the distance required for depositing the grain or seed, and consequently when there is a change made in the number and position of the boxes a corresponding change must be made in the number and position of the beams $e\ e$ and their attachments.

The slide $n$ is a continuous board or plate about the length of the case $i$, and extending from one seed or grain box to the other, passing through their sides and resting upon their bottoms. In each seed-box it has an orifice, $o$, extending entirely through it, and closed below by the bottom of the seed or grain box. One end of this slide also passes through one of the ends of the case, as shown on the right-hand side of Fig. I.

To the spokes of one of the wheels, as shown in Fig. II, $p\ p$, and in dotted lines on the wheel $b'$ in Fig. I, there is secured one, two, or more cams, the number of these cams being governed by the distance required for dropping the seed or grains apart. The rim $p'$, to which these cams are attached, may be made of greater or less diameter, to suit the number of cams required or the size of the wheel, and either they or the cams attached to them may be so affixed as to be removable at pleasure and others substituted in their place.

By referring again to $b'$, Fig. I, the end of the slide $n$ (in dotted lines) is seen resting against the inclined plane of one of these cams, (also in dotted lines.) Now, as the wheel revolves and advances the slide rises along the incline plane, and is consequently pressed back toward the left side of the machine, necessarily carrying the orifices $o\ o\ o\ o$, with their contained grain, in the same direction. As soon as the cam has reached its greatest elevation it releases the slide, and this, under the influence of the spring $q$, operating on a pin in the slide, flies back and outward to its greatest extent, carrying the orifices $o\ o\ o\ o$, with their contained grain out of sight under the diaphragm $m\ m\ m\ m$, to the openings through the boxes and case into the tubes $l\ l\ l\ l$, from whence the seed or grain falls into the drill made by the drill-share, to be subsequently covered up by the flaring share behind.

This description presumes, of course, that the seed or grain boxes are filled with seed or grains, and the whole machine in every respect in full operation.

A number of slides may be prepared to suit the changes in the number and position of the grain-boxes or the amount of grain or seed it may be desirable to drop at each throw of the slide.

The slide may be easily removed by taking off the right wheel $b'$, or, if the spokes be not too near together to let it pass, by taking off the rim or plate $b'$. Of course another slide can then be substituted for the one removed; or a single slide might be bored with a sufficient number of holes to suit any position the boxes should be required to occupy, and those not wanted be plugged or stopped up by a cork or bung. In this case a single slide might be made to meet all emergencies.

Of course it will be necessary to have some means of withdrawing the slide into the case whenever it is necessary to back the machine or change the direction of the revolution of the wheel $b'$. Many devices may be used for this purpose. The one represented at $r$, Fig. III, is simply a hand-lever in reach of the driver. This lever operates a horizontal beam or lever attached to the slide at some point within the case. When the slide is free the driver, by merely pushing this lever toward the left and dropping the handle into a catch, withdraws the slide from the wheel and holds it so as long as required. When the lid of the case is shut it affords a convenient seat for the driver; but, if desired, another seat may be provided.

The diaphragm $m$ might be placed on the other or left side of the seed or grain boxes, so as to deliver the seed or grain into the tube $l$ when the slide is pushed to its greatest extent to the left; but I think this is not the best, as the grain might become impacted in the orifice $o$ and not always fall out, particularly if the seeding was being done on very smooth land; but with the jar produced by the springing of the slide to the right such an occurrence could scarcely prevent the seed from being shaken out. The object of using this diaphragm is to prevent any more seed or grain from falling into the tube than is carried under it in the holes or orifices in the slide.

The depth for planting the seed or grain will be regulated by the depth of the drill or furrow, and, as different seeds and grains require different depths, this is regulated and determined by means of the cords or chains $g$ and roller $g'$. These, moreover, serve the purpose of lifting the drill and plowshares entirely above the surface of the ground when the machine is not in use or is to be removed from one place to another.

By the adjustable character of the operating parts of this planter it is evident that the grain or seed can be deposited, both as to quantity and position, with almost mathematical accuracy throughout a field of the largest size.

Having thus fully set forth the nature and operation of my invention, what I claim therein, and desire to secure by Letters Patent of the United States, is as follows:

1. The beam $e$ or beams $e\ e$, with their attached drill plows and shares $h\ h$ and hole or orifice for the passage of the tube $l$, when the said beam is adjustable laterally and vertically, substantially in the manner set forth.

2. The movable grain-boxes $k\ k$, in combination with the diaphragms $m\ m$ and tubes or pipes $l\ l$, when constructed and arranged substantially as described.

3. The adjustability of these boxes transversely to the line of motion of the machine or planter, in combination with the lateral adjustability of the beams $e\ e$, as set forth, for the purpose of regulating the width of the drills from each other.

NEAL H. PURCELL.

Witnesses:
E. A. NASH,
GEO. V. HANNA.